E. L. KNAPP & B. F. RONNEBERGER.
EGG BEATER HOLDER.
APPLICATION FILED MAY 27, 1911.
1,005,847.
Patented Oct. 17, 1911.
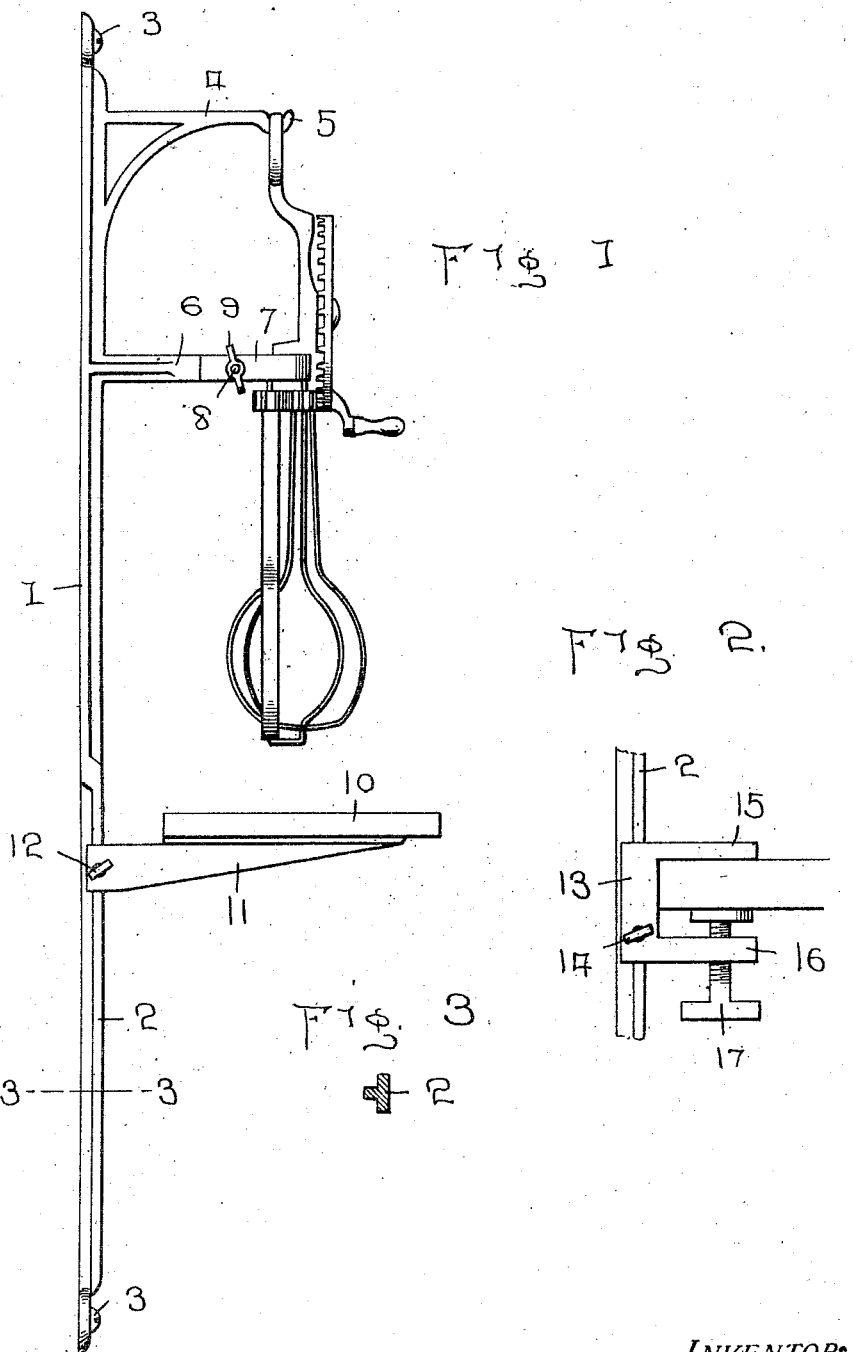
WITNESSES:
INVENTORS
E. L. Knapp
B. F. Ronneberger
BY
W. J. FitzGerald
Attorneys

UNITED STATES PATENT OFFICE.

EDWIN L. KNAPP AND BENJAMIN F. RONNEBERGER, OF ANACORTES, WASHINGTON.

EGG-BEATER HOLDER.

1,005,847. Specification of Letters Patent. Patented Oct. 17, 1911.

Application filed May 27, 1911. Serial No. 629,758.

*To all whom it may concern:*

Be it known that we, EDWIN L. KNAPP and BENJAMIN F. RONNEBERGER, citizens of the United States, residing at Anacortes, in the county of Skagit and State of Washington, have invented certain new and useful Improvements in Egg-Beater Holders; and we do hereby declare the following to be a full, clear, and exact description of the invention, such as will enable others skilled in the art to which it appertains to make and use the same.

This invention relates to egg beater holders and more particularly to means for holding an egg beater while being used, said holder to be secured to the wall or to a table, shelf or the like.

An object of the invention is to provide an egg beater holder which will effectively hold the egg beater while being employed for beating eggs, etc., and which may in turn be secured to the wall or to a table, shelf or the like, to hold said support against movement, leaving the operator's hands free to rotate the beater and to hold the bowl or other receptacle containing the matter to be agitated or to perform other duties, and another object is to construct a support of the above stated character, which is adapted to hold an egg beater of the ordinary type, said beater to be held by the support in such manner that it may be readily disconnected therefrom for cleaning or other purposes.

Other objects and advantages will be hereinafter set forth and pointed out in the specification and claims.

In the accompanying drawings which are made a part of this application, Figure 1 shows the support holding a beater of the ordinary type and having a vertically adjustable receptacle support connected thereto. Fig. 2 is a fragmentary view of the lower portion of the holder, showing its removable means for securing the same to a table, shelf, or the like, said securing means being illustrated as connected to the edge of a table or shelf, and, Fig. 3 is a cross sectional view through the T rail portion of the holder proper, upon which the vertically adjustable shelf and the securing means are movably secured, said view being taken on line 3—3 of Fig. 1.

Referring to the drawings in which similar reference numerals designate corresponding parts throughout the several views, 1 indicates the vertical portion of the egg beater support proper, the lower half of which is in the form in cross section of a T, as indicated at 2 and clearly shown in Fig. 3, the purpose of which will later appear. The upper and lower ends of the vertical portion are rounded and suitably perforated to receive screws 3 or other suitable means for securing the holder to a wall, door frame, or other stationary support.

Integral with the vertical portion 1 of the holder, and extending outwardly from a position near the upper end thereof, is the bracket 4 having the hooked end 5, and a short distance below this bracket is an integral arm 6, which extends outwardly parallel to the bracket 4 and has its outer end suitably curved. Secured to the arm 6 is the short arm 7, which also has a curved outer portion to correspond with the outer curved end of the arm 6, to partly surround and grasp a circular portion of an egg beater of the ordinary type now in use. The arm 7 is connected to the arm 6 by means of the screw 8 and is pressed thereagainst by the adjusting nut 9, working upon the screw 1, as will be understood.

The upper loop end of the ordinary egg beater, when the latter is used with this holder, is positioned in the hooked end 5 of the bracket 4, while the rounded portion above the small gear wheels is positioned between the outer curved portion of the arms 6 and 7, it being understood that the nut 9 has been loosened to allow the arm 7 to separate from the arm 6 in order that the portion of the beater to be grasped by said arms may be received therebetween. The arm 7 is then swung into position opposite the arm 6 and the nut 9 tightened upon the screw 8 to securely grip the egg beater between said arms. It will thus be seen that the egg beater is held in a vertical position. The bowl or other receptacle containing the matter to be agitated by the beater, may then be placed upon the board 10 carried by the arm 11, adjustably secured upon the T rail portion 2 of said holder and held in adjusted position by the set screw 12, or like means. The board 10 and arm 11 may then be adjusted upon the T rail 2, to position the receptacle carried thereon the proper distance below the egg beater, to allow the latter to enter the same and agitate the contents thereof when said beater is rotated by its handle, as will be understood.

When it is desired to secure the holder to a table, shelf, or the like, the clamp 13 is placed upon the T rail 2 and adjusted by means of a set screw 12 employed with the board 10 and arm 11. As will be noted, the clamp 13 has the parallel arms 15 and 16, the upper arm 15 adapted to rest upon the upper surface of the table or shelf to which the support is to be secured, while the lower arm 16 has threaded therethrough, the clamping screw 17, which is adapted to be screwed against the under side of the table or shelf opposite the arm 15 to clamp the support to said table, shelf, or the like. In this instance the board 10 and arm 11 will be unnecessary, as the receptacle containing the matter to be agitated may be placed upon the leaf to which the holder is secured. When the board 10 and arm 11 are not in use they may be stored away or adjustably secured upon the T rail 2 below the clamp 13, so as not to interfere with the other parts of the holder, or the working of the egg beater carried by said holder.

It will thus be seen that we have provided an egg beater holder, which may be so secured to a stationary support such as a wall, or door frame, or to a table, shelf, or the like, and which will effectively serve to hold an egg beater of the ordinary type now in use to agitate matter within receptacles of various sizes and forms. It will also be seen that when this holder is employed to support the agitator, the operator is only required to use one hand to manipulate the agitator, thus leaving the other hand free to perform other duties.

It will be evident that as this holder is of extremely simple construction and of a minimum number of parts, it may be cheaply manufactured and will be effective in performing its duties when used to support an egg beater of ordinary form now in use.

What we claim is:

1. An agitator holder comprising a vertical portion the opposite ends of which are adapted to be secured to a stationary vertical support, a bracelet extending outwardly from said vertical portion near the upper end thereof, an arm extending from said vertical portion a spaced distance below said bracket and parallel therewith, a short arm connected with said arm, said arms adapted to coöperate to grip a portion of the agitator which has its upper end resting in said bracket, and means for adjustably supporting a receptacle containing matter to be agitated a suitable distance below the agitator.

2. A holder comprising a vertical member having its lower portion formed in a guide rail, a bracket extending from said vertical member, parallel arms carried by said vertical portion, one of said arms being loosely connected to the other of said arms, said bracket being adapted to hold the upper end of an agitator, said arms being adapted to co-act to grip a portion of the agitator, means for pressing said loosely connected arm toward the other arm to grip the agitator therebetween, means for securing said holder to a support, and means whereby a receptacle containing matter to be agitated may be carried by said holder.

In testimony whereof we have signed our names to this specification in the presence of two subscribing witnesses.

EDWIN L. KNAPP.
BENJAMIN F. RONNEBERGER

Witnesses:
  W. T. ODLIN,
  LOUIS SEMAR.